US011463228B2

(12) United States Patent
Abedini et al.

(10) Patent No.: US 11,463,228 B2
(45) Date of Patent: *Oct. 4, 2022

(54) DUPLEXING MODES BASED ON POWER CONFIGURATIONS FOR TRANSMISSIONS

(71) Applicant: QUALCOMM Incorporated, San Diego, CA (US)

(72) Inventors: Navid Abedini, Somerset, NJ (US); Sundar Subramanian, San Diego, CA (US); Junyi Li, Chester, NJ (US); Durga Prasad Malladi, San Diego, CA (US); Karl Georg Hampel, Hoboken, NJ (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,107

(22) Filed: Feb. 28, 2019

(65) Prior Publication Data
US 2019/0199504 A1 Jun. 27, 2019

Related U.S. Application Data

(63) Continuation of application No. 16/184,924, filed on Nov. 8, 2018.
(Continued)

(51) Int. Cl.
*H04L 5/16* (2006.01)
*H04W 72/12* (2009.01)
(Continued)

(52) U.S. Cl.
CPC ......... *H04L 5/1438* (2013.01); *H04B 7/0404* (2013.01); *H04B 7/0408* (2013.01);
(Continued)

(58) Field of Classification Search
CPC ........... H04W 72/0446; H04W 72/043; H04W 72/046; H04W 72/12; H04W 36/22; H04L 5/16; H04L 5/0082; H04B 7/0452
(Continued)

(56) References Cited

U.S. PATENT DOCUMENTS

2005/0009527 A1\* 1/2005 Sharma ................. H04W 76/27
455/445
2009/0213765 A1 8/2009 Rinne et al.
(Continued)

FOREIGN PATENT DOCUMENTS

GB 2498559 A 7/2013

OTHER PUBLICATIONS

International Search Report and Written Opinion—PCT/US2018/060170—ISA/EPO—dated Feb. 20, 2019 (180600U2WO).
(Continued)

*Primary Examiner* — Syed Ali
*Assistant Examiner* — Jason A Harley

(57) ABSTRACT

Methods, systems, and devices for wireless communications are described. A wireless device may identify a set of power configurations for a plurality of communications with at least one target device. The set of power configurations may be based at least in part on a type of signal, a type of channel, a parameter of the wireless device, a parameter of the target device, or a combination thereof. The wireless device may then determine a duplexing mode for the plurality of communications based at least in part on the set of power configurations. The duplexing mode may be, for example, a full duplex mode or a half-duplex mode. The wireless device may then transmit the plurality of communications to and/or receive the plurality of communications from the at least one target device according to the set of power configurations and the selected duplexing mode.

26 Claims, 10 Drawing Sheets

Related U.S. Application Data

(60) Provisional application No. 62/583,904, filed on Nov. 9, 2017.

(51) Int. Cl.
| | | |
|---|---|---|
| *H04L 5/14* | (2006.01) | |
| *H04W 52/16* | (2009.01) | |
| *H04J 3/16* | (2006.01) | |
| *H04B 7/0404* | (2017.01) | |
| *H04B 7/06* | (2006.01) | |
| *H04B 7/0408* | (2017.01) | |
| *H04W 52/34* | (2009.01) | |
| *H04L 5/00* | (2006.01) | |
| *H04W 52/24* | (2009.01) | |

(52) U.S. Cl.
CPC ......... *H04B 7/0617* (2013.01); *H04B 7/0619* (2013.01); *H04L 5/0023* (2013.01); *H04L 5/0082* (2013.01); *H04L 5/0092* (2013.01); *H04L 5/16* (2013.01); *H04W 52/243* (2013.01); *H04W 52/343* (2013.01); *H04L 5/001* (2013.01); *H04L 5/0048* (2013.01); *H04L 5/143* (2013.01)

(58) Field of Classification Search
USPC .................................................. 370/276, 296
See application file for complete search history.

(56) References Cited

U.S. PATENT DOCUMENTS

| | | | |
|---|---|---|---|
| 2010/0111007 A1 | 5/2010 | Suo et al. | |
| 2011/0103224 A1 | 5/2011 | Nishioka et al. | |
| 2011/0141991 A1* | 6/2011 | Gao | H04L 1/1887 370/329 |
| 2013/0223294 A1* | 8/2013 | Karjalainen | H04W 64/003 370/277 |
| 2015/0009952 A1 | 1/2015 | Berggren et al. | |
| 2015/0071062 A1 | 3/2015 | Cheng et al. | |
| 2015/0085713 A1 | 3/2015 | He et al. | |
| 2015/0333898 A1 | 11/2015 | Ji et al. | |
| 2015/0334702 A1 | 11/2015 | Ji et al. | |
| 2015/0358924 A1 | 12/2015 | Papasakellariou | |
| 2017/0048647 A1 | 2/2017 | Jung et al. | |
| 2017/0085326 A1 | 3/2017 | Li et al. | |
| 2017/0111094 A1 | 4/2017 | Sartori et al. | |
| 2017/0163403 A1 | 6/2017 | Karjalainen et al. | |
| 2017/0223709 A1 | 8/2017 | Noh | |
| 2017/0257184 A1 | 9/2017 | Stirling-Gallacher et al. | |
| 2017/0302337 A1 | 10/2017 | Liu et al. | |
| 2018/0006690 A1 | 1/2018 | Shepard et al. | |
| 2018/0041326 A1 | 2/2018 | Kazmi et al. | |
| 2018/0092085 A1* | 3/2018 | Shaheen | H04W 36/14 |
| 2018/0270699 A1 | 9/2018 | Babaei et al. | |
| 2018/0272699 A1* | 9/2018 | Martin | B41J 2/04581 |
| 2018/0279307 A1 | 9/2018 | Au et al. | |
| 2018/0295645 A1 | 10/2018 | Yaver et al. | |
| 2018/0309496 A1 | 10/2018 | Lee et al. | |
| 2019/0140812 A1 | 5/2019 | Abedini et al. | |
| 2019/0140813 A1 | 5/2019 | Abedini et al. | |
| 2019/0288828 A1* | 9/2019 | Ibrahim | H04L 27/2607 |

OTHER PUBLICATIONS

VIVO: "Solutions for UE Self-interference," 3GPP Draft; R1-1712872_ Solutions for UE Self-interference, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051315684, 6 pages, Retrieved from the Internet: URL: http://www.3gpp.org/ftp/Meetings_3GPP_SYNC/RAN1/Docs/ [retrieved on Aug. 20, 2017].

* cited by examiner

DUPLEXING MODES BASED ON POWER CONFIGURATIONS FOR TRANSMISSIONS

CROSS REFERENCES

The present Application for Patent is a Continuation of U.S. patent application Ser. No. 16/184,924 by ABEDINI, et al., entitled "DUPLEXING MODES BASED ON POWER CONFIGURATIONS FOR TRANSMISSIONS" filed Nov. 8, 2018, which claims the benefit of U.S. Provisional Patent Application No. 62/583,904 by ABEDINI et al., entitled "DUPLEXING MODES BASED ON POWER CONFIGURATIONS FOR TRANSMISSIONS," filed Nov. 9, 2017, assigned to the assignee hereof, and expressly incorporated herein.

BACKGROUND

The following relates generally to wireless communication at a wireless device, and more specifically to duplexing modes based on power configurations for transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless devices in a wireless communication system may be capable of full duplex data transmission. With full duplex data transmissions, data can be transmitted and received at the same time. For example, a wireless device may transmit uplink communications while at the same time receiving downlink communications. In some examples, the wireless device may have two or more antenna systems (e.g., antenna arrays). Uplink communications may be transmitted using one of the antenna systems, while downlink communications may be received using a different one of the antenna systems.

SUMMARY

The described techniques relate to improved methods, systems, devices, or apparatuses that support duplexing modes based on power configurations for transmissions. Generally, the described techniques provide for a wireless device configured to communicate with at least one target device. The wireless device may identify a set of power configurations for a set of communications with the at least one target device. The wireless device may determine a duplex mode for the set of communications based on the set of power configurations. The wireless device may then communicate with the at least one target device based on the set of power configurations and the duplex mode.

A method of wireless communication at a wireless device is described. The method may include identifying a set of power configurations for a set of communications with at least one target device, determining a duplexing mode for the set of communications based on the identified set of power configurations, and communicating with the at least one target device based on the identified set of power configurations and the determined duplexing mode.

An apparatus for wireless communication at a wireless device is described. The apparatus may include means for identifying a set of power configurations for a set of communications with at least one target device, means for determining a duplexing mode for the set of communications based on the identified set of power configurations, and means for communicating with the at least one target device based on the identified set of power configurations and the determined duplexing mode.

Another apparatus for wireless communication at a wireless device is described. The apparatus may include a processor, memory in electronic communication with the processor, and instructions stored in the memory. The instructions may be operable to cause the processor to identify a set of power configurations for a set of communications with at least one target device, determine a duplexing mode for the set of communications based on the identified set of power configurations, and communicate with the at least one target device based on the identified set of power configurations and the determined duplexing mode.

A non-transitory computer-readable medium for wireless communication at a wireless device is described. The non-transitory computer-readable medium may include instructions operable to cause a processor to identify a set of power configurations for a set of communications with at least one target device, determine a duplexing mode for the set of communications based on the identified set of power configurations, and communicate with the at least one target device based on the identified set of power configurations and the determined duplexing mode.

Some examples of the method, apparatus, and non-transitory computer-readable medium described above may further include processes, features, means, or instructions for identifying a signal type or channel type associated with the set of communications, where the set of power configurations may be identified based on the identified signal type or channel type.

Some examples of the method, apparatus, and non-transitory computer-readable medium described above may further include processes, features, means, or instructions for identifying one or more parameters associated with a capability of the wireless device or with a capability of the at least one target device, where the set of power configurations may be identified based on the identified one or more parameters.

Some examples of the method, apparatus, and non-transitory computer-readable medium described above may further include processes, features, means, or instructions for identifying a level of traffic demand of the wireless device, the at least one target device, or an additional device, where the set of power configurations may be identified based on the identified level of traffic demand.

Some examples of the method, apparatus, and non-transitory computer-readable medium described above may further include processes, features, means, or instructions for identifying one or more parameters associated with one or more wireless communication links between the wireless device and the at least one target device, where the set of power configurations may be identified based on the identified one or more parameters.

In some examples of the method, apparatus, and non-transitory computer-readable medium described above, the duplexing mode may be determined based on a level of traffic demand, capabilities associated with one or more devices, limitations associated with one or more devices, received measurement reports of one or more reference signals, or a combination thereof.

In some examples of the method, apparatus, and non-transitory computer-readable medium described above, the reference signals include at least one of a synchronization signal, a beam reference signal, or a combination thereof.

In some examples of the method, apparatus, and non-transitory computer-readable medium described above, determining the duplexing mode includes, receiving an indication of the duplexing mode for the set of communications.

In some examples of the method, apparatus, and non-transitory computer-readable medium described above, the duplexing mode may be selected by a control node.

In some examples of the method, apparatus, and non-transitory computer-readable medium described above, the control node includes at least one of a central node, a scheduling device of the wireless device, the at least one target device, or any combination thereof.

Some examples of the method, apparatus, and non-transitory computer-readable medium described above may further include processes, features, means, or instructions for communicating a first set of channels, where the first set of channels is a set of control channels, in a first set of time resources of a transmission time interval (TTI) according to a first duplexing mode. Some examples of the method, apparatus, and non-transitory computer-readable medium described above may further include processes, features, means, or instructions for communicating a second set of channels, where the second set of channels is a set of data channels, in a second set of time resources of the TTI according to a second duplexing mode.

In some examples of the method, apparatus, and non-transitory computer-readable medium described above, the first duplexing mode may be a full duplex mode and the second duplexing mode may be a half-duplex mode.

Some examples of the method, apparatus, and non-transitory computer-readable medium described above may further include processes, features, means, or instructions for communicating with the at least one target device according to a full duplex mode.

Some examples of the method, apparatus, and non-transitory computer-readable medium described above may further include processes, features, means, or instructions for transmitting a first control channel in at least one of a downlink direction or an uplink direction in a first set of time resources of a TTI. Some examples of the method, apparatus, and non-transitory computer-readable medium described above may further include processes, features, means, or instructions for receiving a second control channel in at least one of the uplink direction or the downlink direction in the first set of time resources of the TTI.

In some examples of the method, apparatus, and non-transitory computer-readable medium described above, the transmissions of control channels may be scheduled in a downlink direction or an uplink direction in the first time resource of the TTI.

In some examples of the method, apparatus, and non-transitory computer-readable medium described above may further include processes, features, means, or instructions for allocating power between the target device and the second target device based on the set of power configurations.

Some examples of the method, apparatus, and non-transitory computer-readable medium described above may further include processes, features, means, or instructions for transmitting a first control channel to a second wireless device in a first set of time resources of a TTI. Some examples of the method, apparatus, and non-transitory computer-readable medium described above may further include processes, features, means, or instructions for receiving a second control channel from the second wireless device in the first set of time resources of the TTI.

In some examples of the method, apparatus, and non-transitory computer-readable medium described above, the transmission of control channels may be unscheduled in the first set of time resources of the TTI.

In some examples of the method, apparatus, and non-transitory computer-readable medium described above, the duplexing mode includes at least one of a full duplex mode, half duplex mode, single user (SU) multiple input multiple output (MIMO) (SU-MIMO) mode, multiple user (MU) MIMO mode, or a combination thereof.

DETAILED DESCRIPTION

In a full duplex mode, a wireless device may transmit and receive communications simultaneously. However, the receiving antenna at the wireless device may experience self-interference (SI) from the transmitting antenna (e.g., the signals transmitted by the transmitting antenna may interference with the signals sent to the wireless device from another wireless device in the wireless communication system). Depending on the extent of the SI, the use of full duplex mode may impair the ability of the wireless device to receive communications from other wireless devices.

The extent of the SI may be based on the power level of the received signal, the power level of the transmitted signal, and the link budget and/or signal to interference plus noise ratio (SINR) requirements of the received signal. If the power level of the transmitted signal is much greater than the power level of the received signal and/or the received signal requires a large SINR, operation in the full duplex mode may not improve the data capacity of the wireless communication system. In one example, the data capacity may be decreased.

Accordingly, a wireless device may select a duplex or duplexing mode based on a set of power configurations for communications with other wireless devices in the wireless communication system. The wireless device may determine the power configurations for the communications based on a type of signal, a type of channel, a parameter of a transmitting device, a parameter of a receiving device, or a combination thereof.

The wireless device may then select a duplex mode based on the determined set of power configurations. The duplex mode may be a full duplex mode when the transmitted signal and the received signal will not interfere with each other such that reception of either signal is impaired. The duplex mode may be a half-duplex mode when operation in full duplex mode may impair reception of at least one of the signals.

The wireless device may then transmit and/or receive communications in accordance with the set of power configurations and the selected duplex mode. For example, the wireless device may both transmit and receive communications simultaneously when a full-duplex mode is selected. In contrast, the wireless device may either transmit or receive, but not both, when a half-duplex mode is selected. In this manner, problems caused by SI may be decreased or minimized.

Aspects of the disclosure are initially described in the context of a wireless communications system. Aspects of the disclosure are further illustrated by, and described with reference to, apparatus diagrams, system diagrams, and flowcharts that relate to duplexing modes based on power configurations for transmissions.

Figure 1:
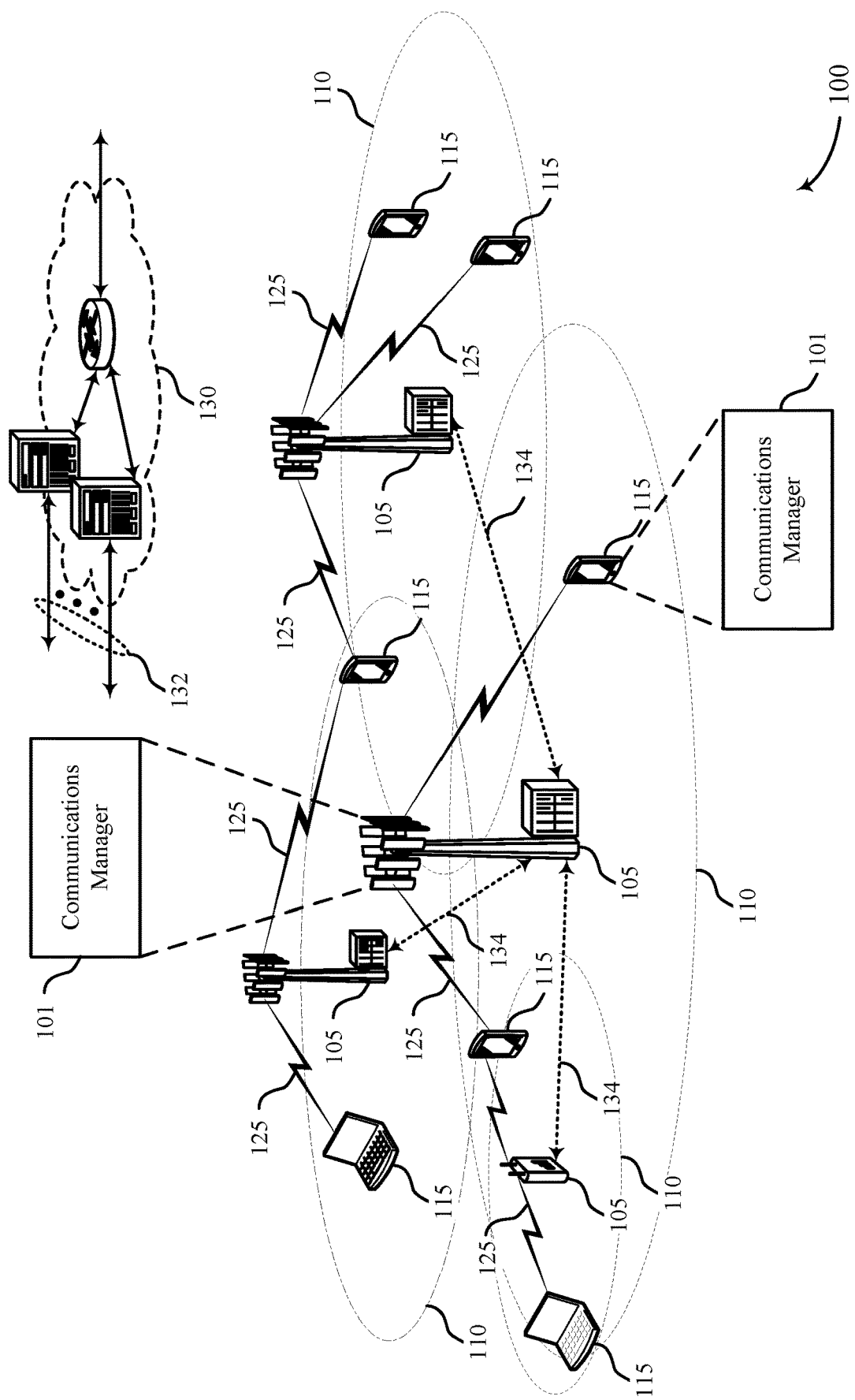
FIG. 1 illustrates an example of a wireless communications system that supports duplexing modes based on power configurations for transmissions in accordance with aspects of the present disclosure.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-S-OFDM).

The organizational structure of the carriers may be different for different radio access technologies (e.g., LTE, LTE-A, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 and/or UEs may include a communications manager 101, which may be configured to determine a duplex mode for transmissions. In some examples, the communications manager 101 may be configured to determine power configurations for one or more communications with a target device. The communications manager 101 may be configured to determine the power configurations based on a type of signal, a type of channel, one or more parameters of the base station 105 or UE 115, one or more parameters of the target device, and combinations thereof.

In some examples, the communications manager 101 may be configured to determine a duplex mode based on the identified set of power configurations. In some examples, the communications manager 101 may be configured to receive an indication of a duplex mode for the communications from one or more control nodes, and may determine the duplex mode based on the received indication.

In some examples, the selected duplex mode may be a full duplex mode, in which the base station 105 or UE 115 may transmit and receive communications in the same time resources (e.g., a slot or mini-slot) of a TTI (e.g., a frame or sub-frame). In some other examples, the selected duplex mode may be a half-duplex mode, in which the base station 105 or UE 115 may transmit or receive communications, but may not do both, in the same time resources of a TTI. A half-duplex mode may be a transmission mode or a reception mode. In some examples, a half-duplex mode may be a SU-MIMO mode or a MU-MIMO mode.

The communications manager 101 may be further configured to transmit and/or receive communications based on the power configurations and/or the selected duplex mode.

Figure 2:
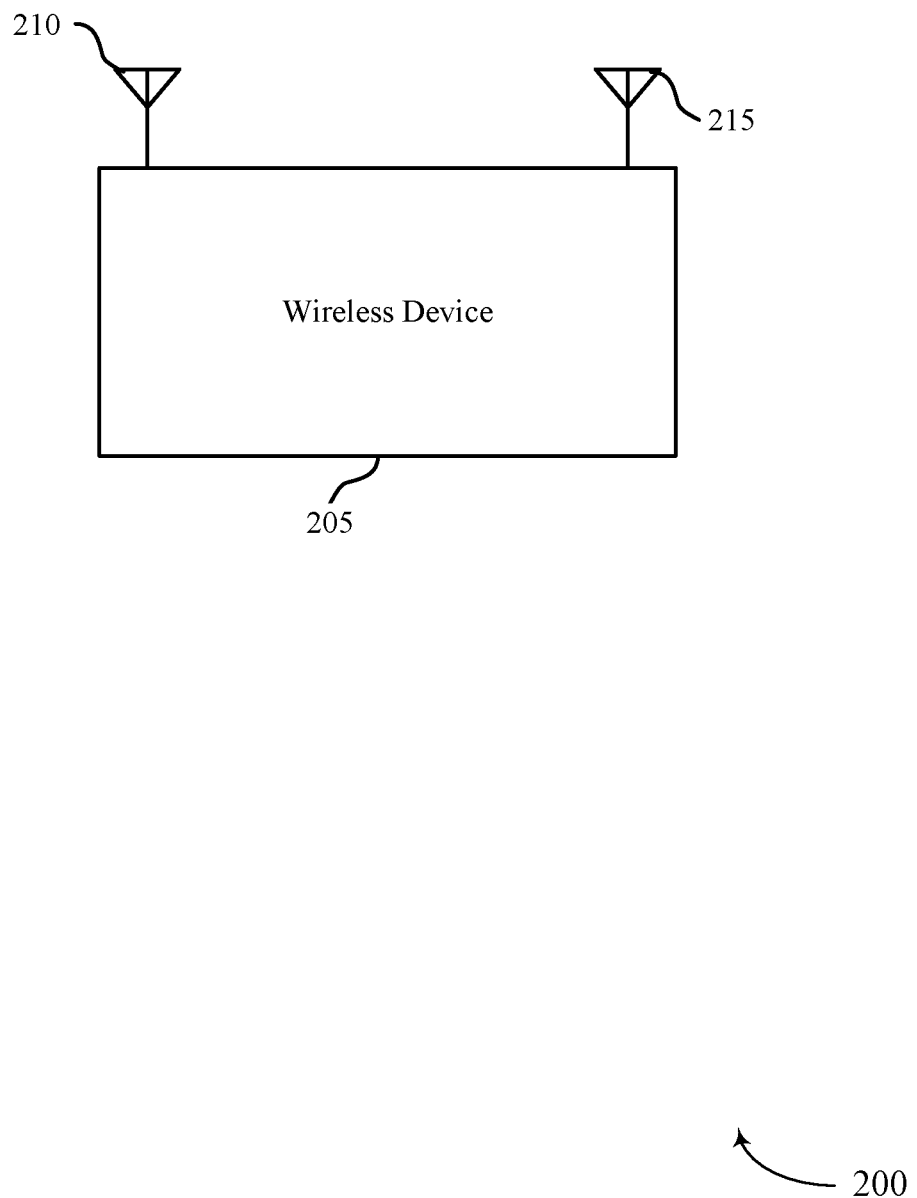
FIG. 2 illustrates an example of a wireless device that supports duplexing modes based on power configurations for transmissions in accordance with aspects of the present disclosure.

FIG. 2 illustrates an example of a wireless communication system 200 that supports duplexing modes based on power configurations for transmissions in accordance with various aspects of the present disclosure. In some examples, wireless communication system 200 may implement aspects of wireless communication system 100.

The wireless communication system may include a wireless device 205. In some examples, a wireless device 205 may be an example of aspects of a base station 105 as described with reference to FIG. 1. In some other examples, a wireless device 205 may be an example of aspects of a UE 115 as described with reference to FIG. 1. In some other examples, a wireless device 205 may be a relay that supports both UE functionality (receiving downlink control information and/or transmitting uplink control information) and base station functionality (receiving uplink control information and/or transmitting downlink control information). Uplink transmissions by such a relay may be scheduled by the downlink control information received by the UE functionality, and the relay may schedule the uplink transmissions received from other UEs in the system in the downlink control information transmitted by the base station functionality.

The wireless device 205 may include a first antenna system 210 and a second antenna system 215. Accordingly, the wireless device 205 may be capable of transmitting and receiving at the same time (e.g., by transmitting signals using the first antenna system 210 and receiving signals using the second antenna system 215). However, such operation may cause SI, where the transmission using the first antenna system 210 causes interference with the reception at the second antenna system 215. The level of SI may depend on the transmitted and received power levels. If the level of SI is too high, the wireless device 205 may not be able to transmit and receive simultaneously.

The wireless device 205 may determine power configurations for communications with one or more other wireless devices in the wireless communication system. For example, the wireless device 205 may determine a transmission power level (e.g., for a transmission from the wireless device 205 to a first wireless device in the wireless communication system using the first antenna system 210) and a reception power level (e.g., for a reception at the wireless device 205 from a second wireless device in the wireless communication system using the second antenna system 215).

In some examples, the wireless device 205 may determine power configurations (e.g., transmission and/or reception power levels) for communications with one or more other wireless devices based on a type of signal and/or a type of channel being transmitted or received. For example, power configuration may be allocated between multiple devices in a full duplex, MU-MIMO mode. For example, some channels (e.g., physical downlink control channels (PDCCH) and/or physical uplink control channels (PUCCH)) may be able to operate without a high link budget, e.g., without a high SINR. For example, these channels may be transmitted using a low modulation and coding scheme (MCS). Accordingly, such channels may be transmitted and/or received with lower power levels. In some cases, in a full duplex, MU-MIMO mode, a first wireless device may transmit on a channel with a low SINR. This first wireless device may be allocated less power than a second wireless device that may transmit on a channel with a high SINR. In some examples, channels with low link budget requirements may be received with sufficient link budget even in the presence of a relatively large interference such as SI.

In some other examples, the wireless device 205 may determine power configurations based on parameters of the wireless device 205 and/or a target device. In some examples, the parameters may include capabilities of the device 205 (e.g., analog/digital processing capabilities, beamforming capabilities, number of antennas, number of digital chains, and/or beam-correspondence capabilities). In some examples, the parameters may include transmission power capabilities or a location or relative location (e.g., angular direction or distance) of the wireless device 205 and the target wireless device.

In some other examples, the wireless device 205 may determine the power configurations based on traffic demand in the wireless communication system and/or one or more parameters associated with one or more wireless links between communicating devices (e.g., pathloss or direction).

The wireless device 205 may then determine a duplex mode for the communications. The wireless device 205 may select a full duplex mode when the level of SI does not cause reception problems at the second antenna system 215, and may select a half-duplex mode when the level of SI may cause reception problems at the second antenna system 215.

In some examples, the wireless device 205 may select a full duplex mode when both a transmission and a reception involve a control channel, which may be received with a lower SINR (e.g., a higher interference). In some other examples, the wireless device 205 may select a half-duplex mode when the transmission and/or reception involve a data channel, which should be received with a larger SINR (e.g., a smaller interference).

In some examples, the wireless device 205 may also consider latency requirements in determining whether to select a full duplex mode or a half-duplex mode. For example, the wireless device 205 may select a full duplex mode for control communications due to the benefits of having more frequent opportunities to transmit and receive control channels in reducing latency.

In some examples, a half-duplex mode may be a transmission mode or a reception mode. The wireless device 205 may select between the transmission mode and the reception mode based on a control signal, e.g., a scheduling grant. In some examples, a half-duplex mode may be an SU-MIMO mode or an MU-MIMO mode.

In some examples, the duplex mode is selected by a control node and may be communicated to other wireless devices in the network using a control channel. The control node may be wireless device 205. In other examples, the control node may be a central node, a scheduler of wireless device 205, or any of the target wireless devices. In some examples, the duplex mode may be jointly determined by two or more wireless devices in the wireless communication system. The control node may determine the duplex mode based on receiving one or more signals from the wireless device 205 and/or other wireless devices in the wireless communication system. The signals may indicate, for example, traffic demands, capabilities, or limitations of the transmitting wireless device. In some examples, the signals may include measurement reports. In some other examples, the signals may include reference signals such as sync or beam reference signals such as channel state information—reference signals (CSI-RS).

The wireless device 205 may then transmit and/or receive communications based on the power configurations and the duplex mode.

Figure 3:
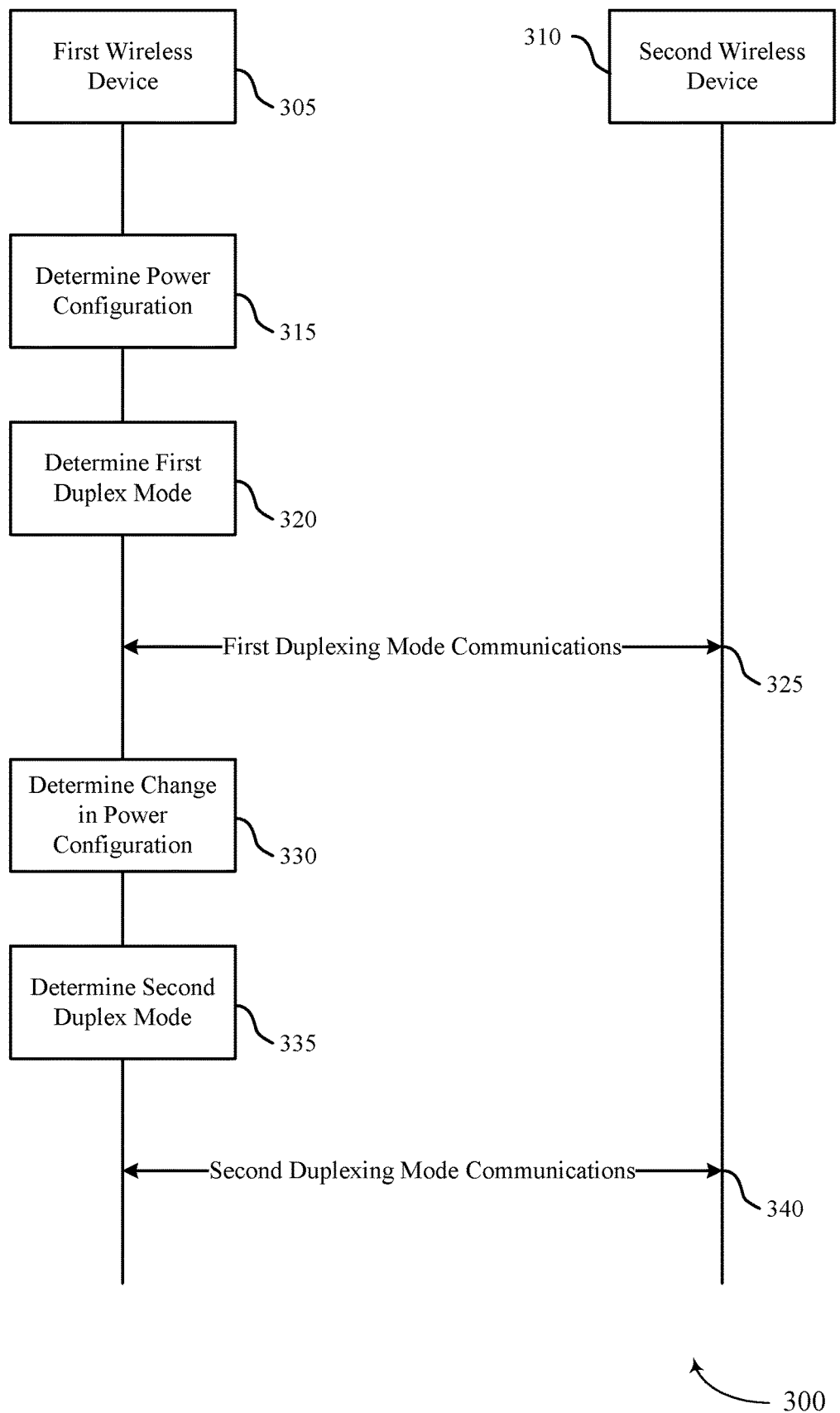
FIG. 3 illustrates an example of a communications flow in a wireless communication system that supports duplexing modes based on power configurations for transmissions in accordance with aspects of the present disclosure.

FIG. 3 illustrates an example of a communication flow 300 in a wireless communication system that supports duplexing modes based on power configurations for transmissions in accordance with various aspects of the present disclosure. In some examples, the wireless communication system may implement aspects of wireless communication system 100.

The communication flow 300 shows communications between a first wireless device 305 and a second wireless device 310. In some examples, the first wireless device 305 may be an example of aspects of a UE 115 and/or a base station 105 as described with reference to FIG. 1. In some examples, the second wireless device 310 may be an example of aspects of a UE 115 and/or a base station 105 as described with reference to FIG. 1.

The first wireless device 305 may determine power configurations for communications with one or more wireless devices in the wireless communication system including at least the second wireless device at 315. The power configurations may include, for example, a power level. In some examples, the power configurations may be determined based on a type of signal or a type of channel being received and/or transmitted. For example, some channels (such as a PDCCH or a PUCCH) may operate without a high link budget and/or SINR. Accordingly, signals on these channels may be transmitted using a low MCS, and as such may be transmitted with a low power level.

In some examples, a low power level may be used for control signals and/or control channels, and a high power level may be used for data signals and/or data channels.

In some examples, the power configurations may be determined based on parameters of the first wireless device 305 and/or the second wireless device 310. For example, the power configurations may be determined based on the capabilities of the first wireless device 305 and/or the second wireless device 310, e.g., analog or digital processing capabilities, beamforming capabilities, number of antennas, number of digital chains, beam-correspondence capabilities. In some examples, the power configurations may be based on transmission power capabilities of the first wireless device 305 and/or the second wireless device 310. In some examples, the power configurations may be determined based on a location or relative location of the first wireless device 305 and/or the second wireless device 310 (e.g., angular direction or distance, which may correspond to pathloss).

The first wireless device 305 may determine a first duplex mode for the transmissions at 320. The duplex mode may be, for example, a full duplex mode, in which the first wireless device 305 may transmit and receive in the same time resources in the same TTI. In some other examples, the duplex mode may be, for example, a half-duplex mode, in which the first wireless device 305 may either transmit or receive, but not both, in the same time resources in the same TTI. The half-duplex mode may be, for example, a reception mode or a transmission mode. The half-duplex mode may also be a SU-MIMO mode or a MU-MIMO mode.

The first duplex mode may be determined based on the power configurations, e.g., a power level. In some examples, control channels may be configured with a wide beam and data channels may be transmitted using a narrow beam. The beam width threshold may be set such that control signals may be transmitted according to a full duplex mode and data signals may be transmitted according to a half-duplex mode.

The first wireless device 305 may transmit and/or receive first duplexing mode communications 325 based on the power configurations and the first duplex mode. For example, the first wireless device 305 may transmit control signals at a low power level and receive control signals at a low power level. In some other examples, the first wireless device 305 may either receive or transmit data signals at a high power level.

After transmitting the first duplexing mode communications 325, the parameters used to determine the power configurations may change. For example, the communications between the first wireless device 305 and the second wireless device 310 may switch from a first type of signal or channel (e.g., a control signal or control channel) to a second type of signal or channel (e.g., a data signal or data channel). In other examples, parameters associated with the first wireless device 305 and/or the second wireless device 310 may change (e.g., because the location or relative location of the wireless devices has changed).

The first wireless device 305 may determine a change in the power configuration at 330. The first wireless device 305 may determine the new power configurations as discussed with respect to the determination of the original power configurations at 315. The first wireless device 305 may determine a second duplex mode based on the new power configurations at 335. The first wireless device 305 may determine the second duplex mode as discussed with respect to the determination of the first duplex mode at 320. The first wireless device 305 may then transmit and/or receive second duplexing mode communications 340 based on the new power configurations and the second duplex mode. For example, when the first duplex mode is a full duplex mode and the second duplex mode is a half-duplex mode for reception, the first wireless device 305 may cease transmission until a new duplex mode is selected.

Figure 4:
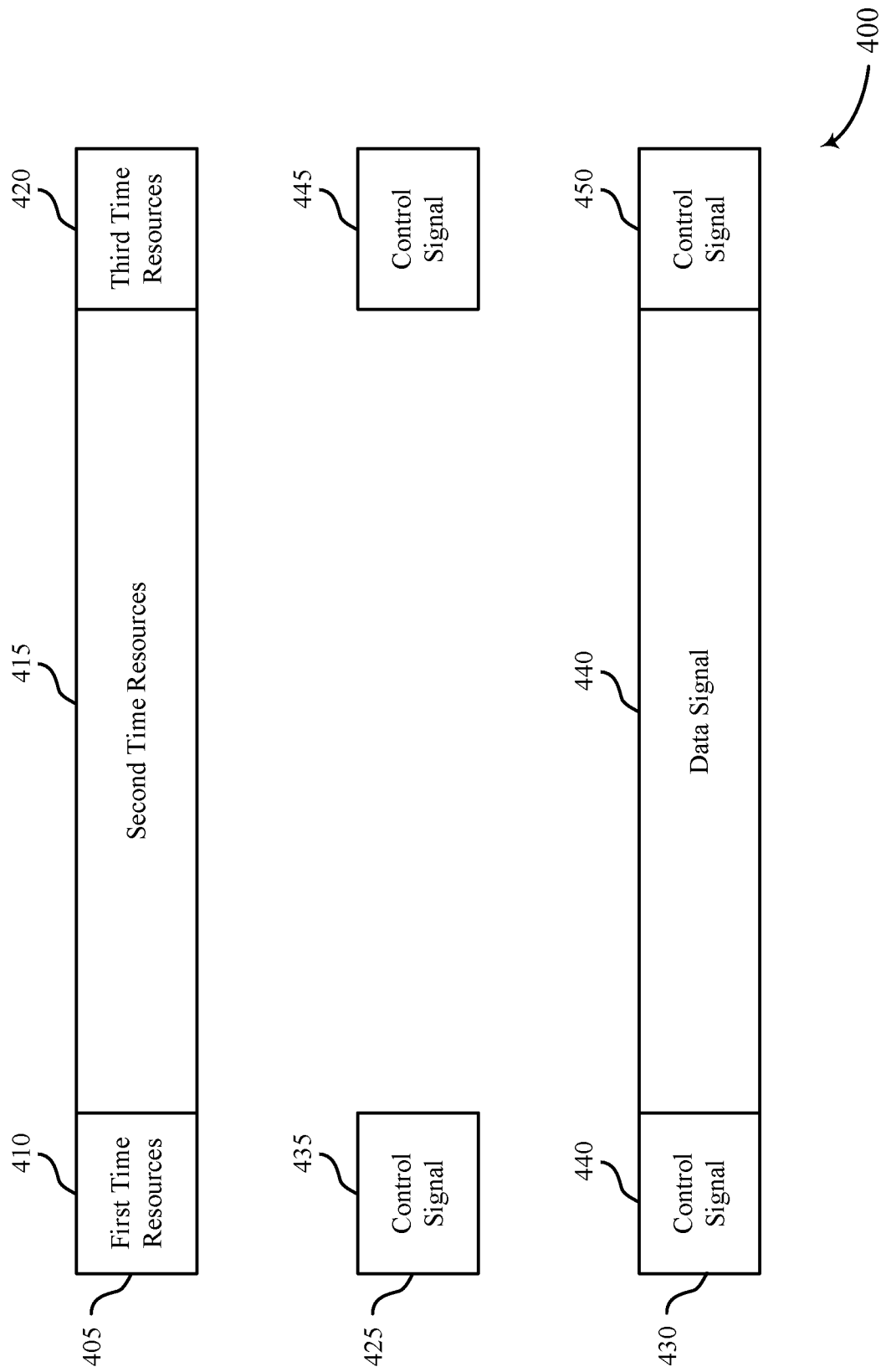
FIG. 4 illustrates an example of communications in a wireless communication system that supports duplexing modes based on power configurations for transmissions in accordance with aspects of the present disclosure.

FIG. 4 illustrates an example of communications 400 in a wireless communication system that supports duplexing modes based on power configurations for transmissions in accordance with various aspects of the present disclosure. In some examples, wireless communication system may implement aspects of wireless communication system 100.

The communications 400 may be transmitted in accordance with a TTI 405. The TTI 405 may be, for example, a frame or a sub-frame. The TTI 405 may include a set of time resources including a first time resource 410, a second time resource 415, and a third time resource 420. The time resources may be, for example, slots or mini-slots or a number of symbols. In some examples, first time resource 410 and third time resource 420 may be control slots, and second time resource 415 may be a data slot.

The communications 400 may include a first transmission stream 425 and a second transmission stream 430. The first transmission stream 425 shows transmissions by a first wireless device, which may be an example of aspects of first wireless device 305 described with reference to FIG. 3. The second transmission stream 430 shows transmissions by a second wireless device, which may be an example of aspects of second wireless device 310 described with reference to FIG. 3.

The first wireless device may recognize that the communications in the first time resource 410 may be transmitted and/or received over a control channel. Accordingly, the first wireless device may determine that the communications in the first time resource 410 may be transmitted and/or received using a low power level, and may select a full duplex mode for the first time resource 410. The first wireless device may transmit a control signal 435 in the first time resource 410. The control signal 435 may be, for example, a scheduling grant which grants the second time resource 415 to the second wireless device. The control signal 435 may be transmitted using a low power level.

The second wireless device may likewise select a full duplex mode for the first time resource 410. The second wireless device may accordingly transmit a control signal 440 in the first time resource 410. The control signal 440 may be, for example, a scheduling request. The control signal 440 may be transmitted using a low power level. In some other examples, the second wireless device may select a half-duplex mode for the first time resource 410 based on the power configurations at the second wireless device, and may not transmit the control signal 440.

The first wireless device may recognize that the communications in the second time resource 415 may be transmitted and/or received over a data channel. Accordingly, the first wireless device may determine that the communications in the second time resource 415 may be transmitted and/or received using a high power level, and may select a half-duplex mode. The first wireless device may select a half-duplex reception mode based on the scheduling grant in the control signal 435. The first wireless device may accordingly refrain from transmitting during the second time resource 415.

In some examples, the half-duplex reception mode may be a MU-MIMO mode, in which the first wireless device may serve two or more wireless devices (including the second wireless device) simultaneously. In some other examples, the half-duplex reception mode may be a SU-MIMO mode, in which the first wireless device may serve only the second wireless device with an increased data rate.

The second wireless device may likewise select a half-duplex mode for the second time resource 415. However, the second wireless device may select a half-duplex transmission mode based on the scheduling grant in the control signal 435. The second wireless device may accordingly transmit a data signal 440 in the second time resource 415. The data signal 440 may be transmitted using a high power level.

In some examples, the half-duplex mode may be a MU-MIMO transmission mode, in which the second wireless device may serve two or more wireless devices (including the first wireless device) simultaneously. In some other examples, the half-duplex transmission mode may be a SU-MIMO mode, in which the second wireless device may serve only the first wireless device with an increased data rate.

The first wireless device may recognize that the communications in the third time resource 420 may be transmitted and/or received over a control channel. Accordingly, the first wireless device may determine that the communications in the third time resource 420 may be transmitted and/or received using a low power level, and may select a full duplex mode for the third time resource 420. The first wireless device may transmit a control signal 445 in the third time resource 420. The control signal 445 may be, for example, an acknowledgement (ACK) in response to receiving the data signal 440. In some other examples, the control signal 445 may be a negative acknowledgement (NACK) in response to not receiving the data signal 440. The control signal 445 may be transmitted at a low power level.

The second wireless device may likewise select a full duplex mode for the third time resource 420. The second wireless device may accordingly transmit a control signal 450 in the third time resource 420. The control signal 450 may be, for example, a scheduling request for another data transmission. The control signal 450 may be transmitted using a low power level.

Although communications in this example, and throughout this application, have been described with reference to a first wireless device and a second wireless device, it should be understood that the techniques described herein may be used for communications between a first wireless device and one or more other wireless nodes in a communication system. For example, a first wireless device operating in full-duplex mode may transmit a control signal to a second wireless device and receive a control signal from a third wireless device. In such examples, the second and/or third wireless devices may be operating in a half-duplex mode, e.g., the second wireless device may be operating in a half-duplex reception mode and the third wireless device may be operating in a half-duplex transmission mode.

Figure 5:
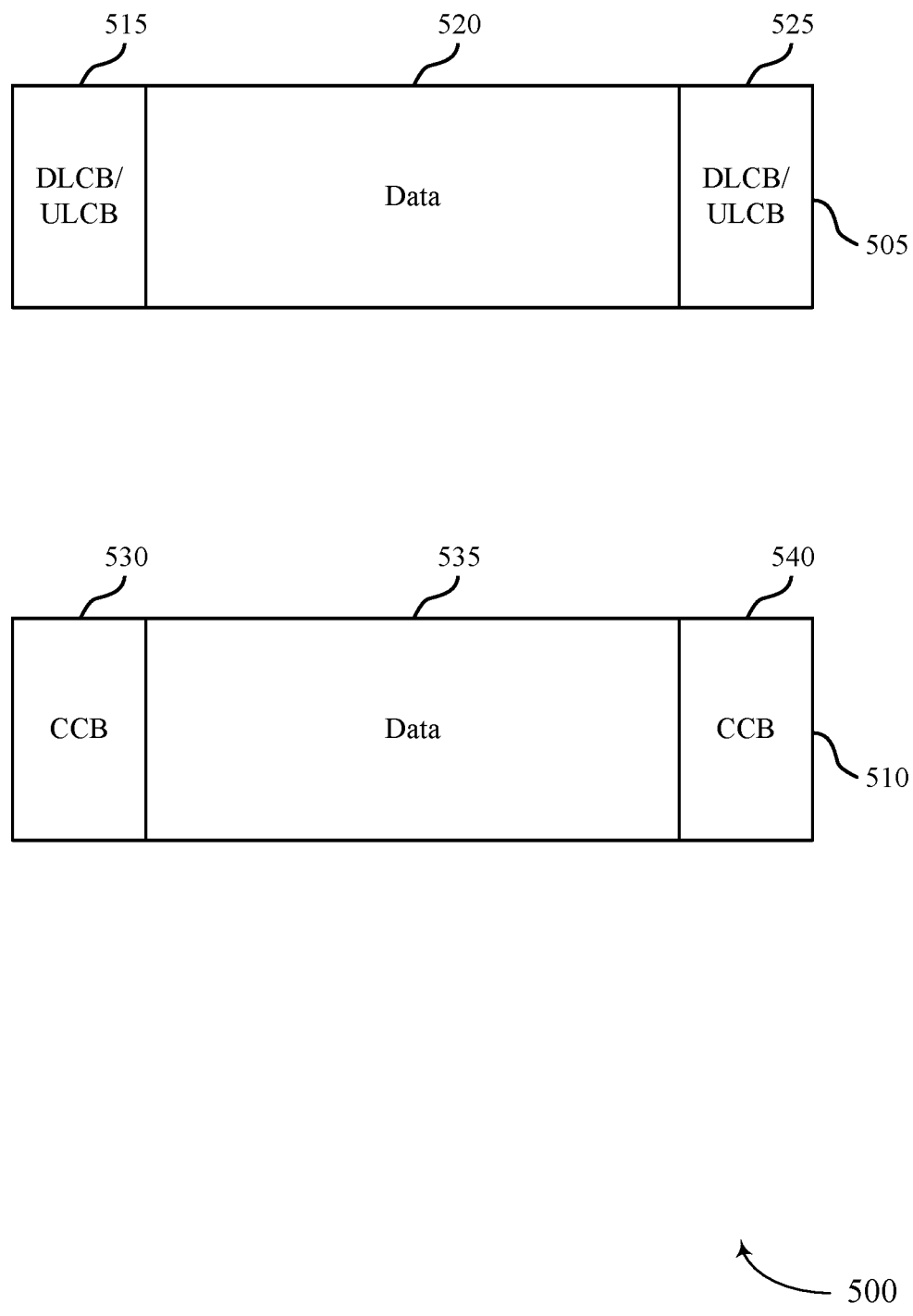
FIG. 5 illustrates an example of frame structures that support duplexing modes based on power configurations for transmissions in accordance with aspects of the present disclosure.

FIG. 5 illustrates an example of frame structures 500 that support duplexing modes based on power configurations for transmissions in accordance with various aspects of the present disclosure. The frame structures 500 may include a first frame structure 505 and a second frame structure 510.

The first frame structure 505 may include a first joint downlink control block (DLCB)/uplink control block (ULCB) region 515, a data region 520, and a second joint DLCB/ULCB region 525. A scheduling node (e.g., a base station 105 or a UE 115 as described with reference to FIG. 1) may transmit downlink control information (DCI) to one or more scheduled nodes (e.g., UEs 115 as described with reference to FIG. 1) in the first joint DLCB/ULCB region 515. The scheduling node may also receive uplink control information (UCI) from one or more scheduled nodes in the first joint DLCB/ULCB region 515. Uplink control transmissions may be scheduled (e.g., in an earlier downlink control transmission). The group of scheduled nodes that receive DCI may not be the same as the group of scheduled nodes that transmits UCI. In some examples, the DCI may include a scheduling grant for one or more of the scheduled nodes in the data region 520. DCI and UCI may be transmitted in the second DLCB/ULCB region 525. In some other examples, the second DLCB/ULCB region 525 may be omitted.

The second frame structure 510 may include a first common control block (CCB) region 530, a data region 535, and a second CCB region 540. The second frame structure 510 may be used for a flat device-to-device network. The first and/or second CCB regions 530 and 540 may be used to transmit control signals and/or control channels. The control signals and/or control channels may include an indication of an upcoming transmission such as a scheduling grant. For example, first CCB region 530 may be used to transmit a scheduling grant for the data region 535. In other examples, the control signals and/or control channels may include a request for some transmission (e.g., a scheduling grant), an acknowledgement, or an indication of a change in the transmission schedule.

Figure 6:
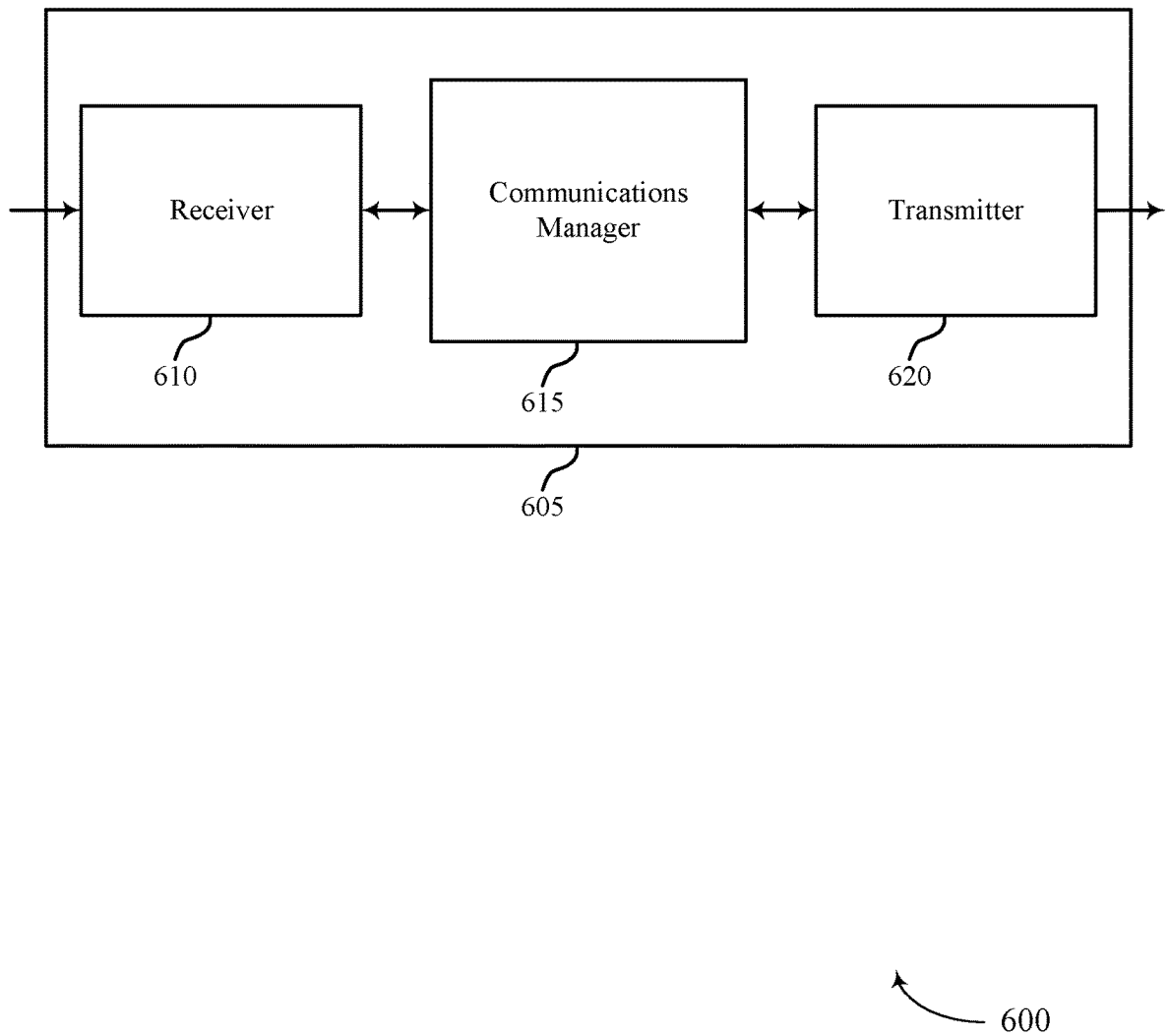
FIGS. 6 through 8 show block diagrams of a device that supports duplexing modes based on power configurations for transmissions in accordance with aspects of the present disclosure.

FIG. 6 shows a block diagram 600 of a wireless device 605 that supports duplexing modes based on power configurations for transmissions in accordance with aspects of the present disclosure. Wireless device 605 may be an example of aspects of a wireless device 205 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to duplexing modes based on power configurations for transmissions, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 615 may identify a set of power configurations for a set of communications with at least one target device, determine a duplexing mode for the set of communications based on the identified set of power configurations, and communicate with the at least one target device based on the identified set of power configurations and the determined duplexing mode. The communications manager 615 may also allocate power between the target device and the second target device based on the set of power configurations.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
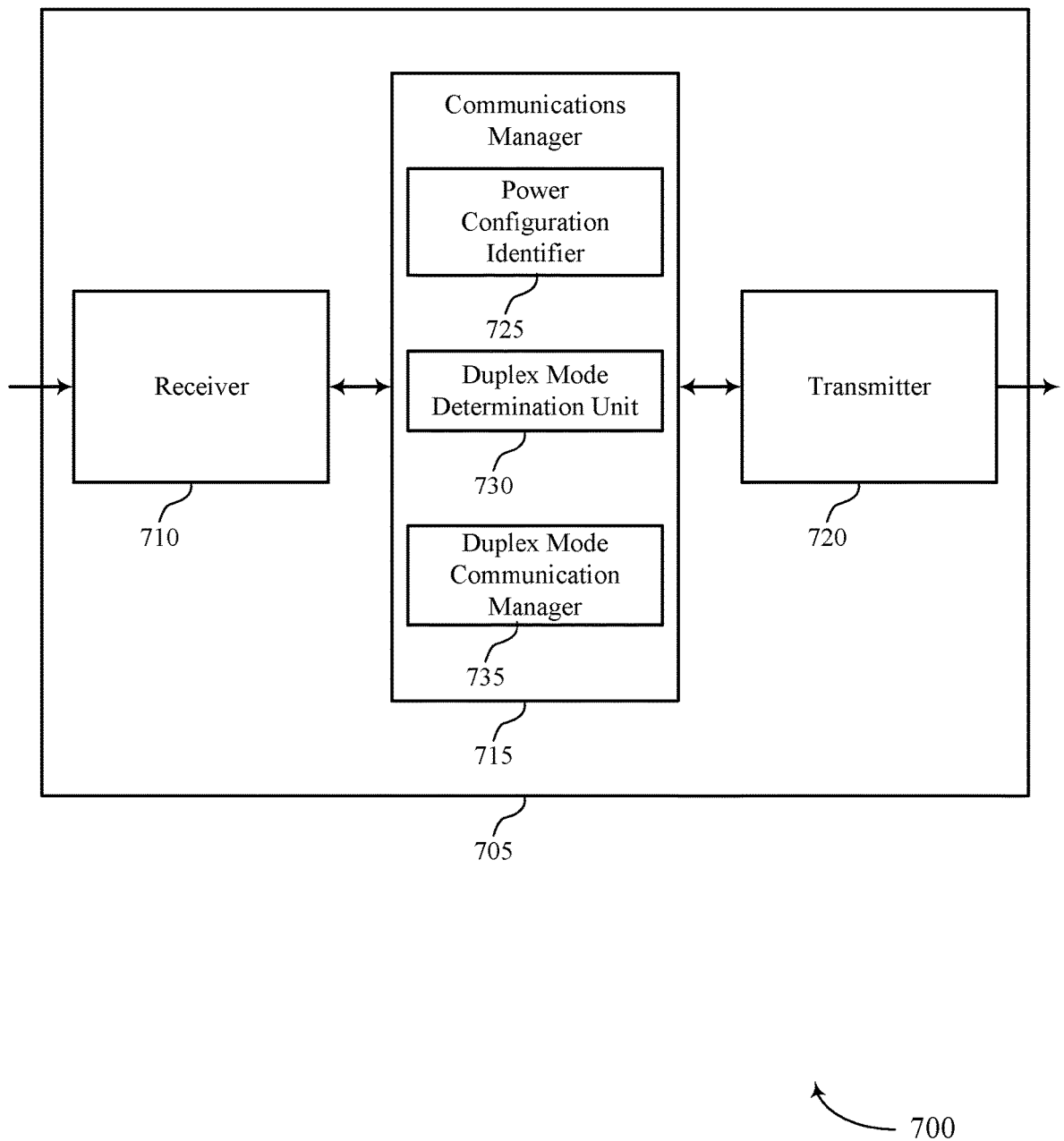

FIG. 7 shows a block diagram 700 of a wireless device 705 that supports duplexing modes based on power configurations for transmissions in accordance with aspects of the present disclosure. Wireless device 705 may be an example of aspects of a wireless device 605 or a wireless device 205 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to duplexing modes based on power configurations for transmissions, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include power configuration identifier 725, duplex mode determination unit 730, and duplex mode communication manager 735.

Power configuration identifier 725 may identify a set of power configurations for a set of communications with at least one target device.

Duplex mode determination unit 730 may determine a duplexing mode for the set of communications based on the identified set of power configurations. In some cases, the duplexing mode is determined based on a level of traffic demand, capabilities associated with one or more devices, limitations associated with one or more devices, received measurement reports of one or more reference signals, or a combination thereof. In some cases, the reference signals include at least one of a synchronization signal, a beam reference signal, or a combination thereof. In some cases, determining the duplexing mode includes: receiving an indication of the duplexing mode for the set of communications. In some cases, the duplexing mode is selected by a control node. In some cases, the control node includes at least one of a central node, a scheduling device of the wireless device, the at least one target device, or any combination thereof. In some cases, the duplexing mode includes at least one of a full duplex mode, half duplex mode, SU-MIMO mode, MU-MIMO mode, or a combination thereof.

Duplex mode communication manager 735 may communicate with the at least one target device based on the identified set of power configurations and the determined duplexing mode, communicate a second set of channels, where the second set of channels is a set of data channels, in a second set of time resources of the TTI according to a second duplexing mode, communicate with the at least one target device according to a full duplex mode, communicate a first set of channels, where the first set of channels is a set of control channels, in a first set of time resources of a TTI according to a first duplexing mode, receive a second control channel in at least one of the uplink direction or the downlink direction in the first set of time resources of the TTI, transmit a first control channel to a second wireless device in a first set of time resources of a TTI, receive a second control channel from the second wireless device in the first set of time resources of the TTI, and transmit a first control channel in at least one of a downlink direction or an uplink direction in a first set of time resources of a TTI. In some cases, the transmission of control channels is unscheduled in the first set of time resources of the TTI. In some cases, the first duplexing mode is a full duplex mode and the second duplexing mode is a half-duplex mode. In some cases, the transmissions of control channels are scheduled in a downlink direction or an uplink direction in the first time resource of the TTI.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
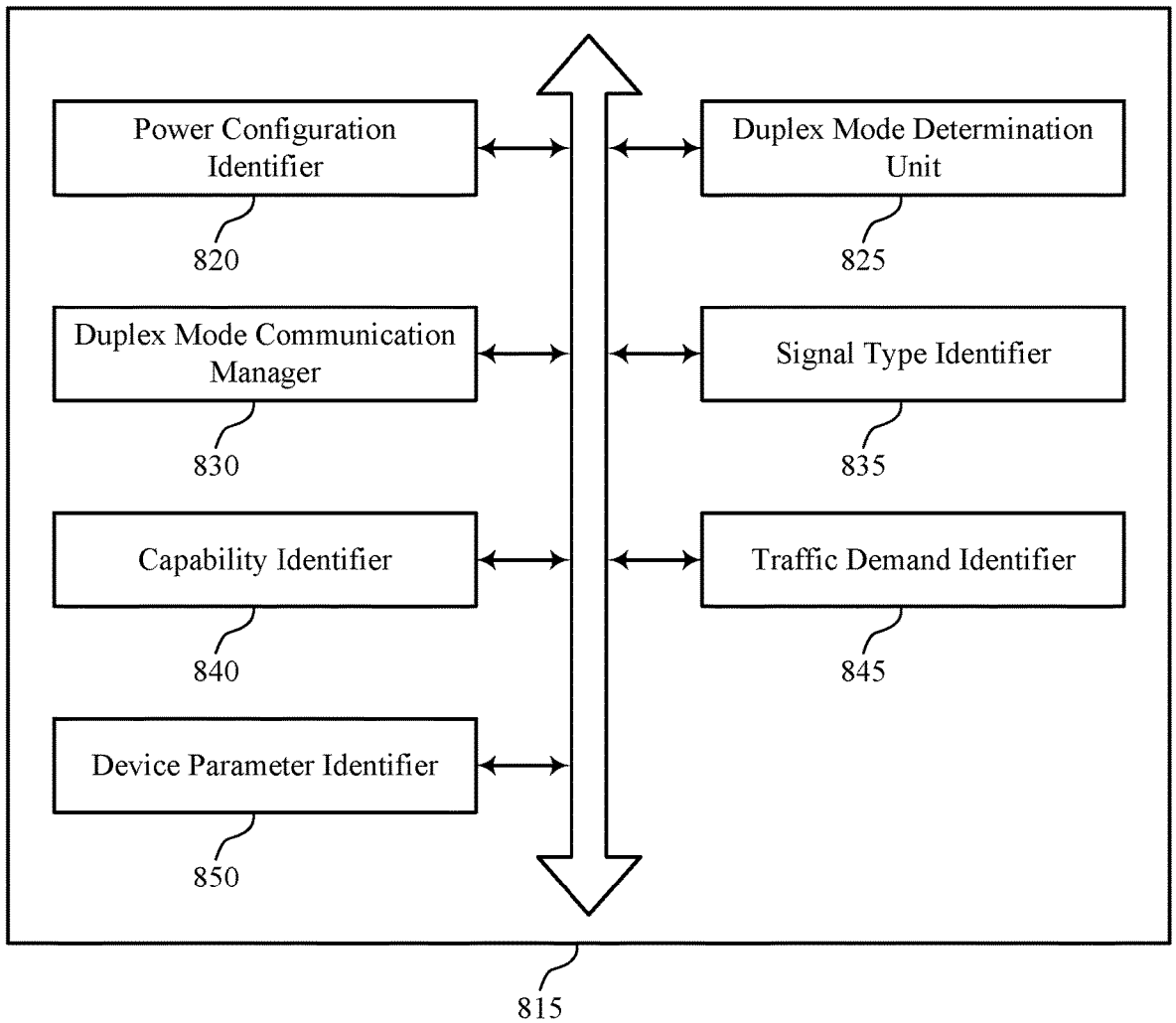

FIG. 8 shows a block diagram 800 of a communications manager 815 that supports duplexing modes based on power configurations for transmissions in accordance with aspects of the present disclosure. The communications manager 815 may be an example of aspects of a communications manager 615, a communications manager 715, or a communications manager 915 described with reference to FIGS. 6, 7, and 9. The communications manager 815 may include power configuration identifier 820, duplex mode determination unit 825, duplex mode communication manager 830, signal type identifier 835, capability identifier 840, traffic demand identifier 845, and device parameter identifier 850. Each of these modules may communicate, directly or indirectly, with one another (e.g., via one or more buses).

Power configuration identifier 820 may identify a set of power configurations for a set of communications with at least one target device.

Duplex mode determination unit 825 may determine a duplexing mode for the set of communications based on the identified set of power configurations. In some cases, the duplexing mode is determined based on a level of traffic demand, capabilities associated with one or more devices, limitations associated with one or more devices, received measurement reports of one or more reference signals, or a combination thereof. In some cases, the reference signals include at least one of a synchronization signal, a beam reference signal, or a combination thereof. In some cases, determining the duplexing mode includes: receiving an indication of the duplexing mode for the set of communications. In some cases, the duplexing mode is selected by a control node. In some cases, the control node includes at least one of a central node, a scheduling device of the wireless device, the at least one target device, or any combination thereof. In some cases, the duplexing mode includes at least one of a full duplex mode, half duplex mode, SU-MIMO mode, MU-MIMO mode, or a combination thereof.

Duplex mode communication manager 830 may communicate with the at least one target device based on the identified set of power configurations and the determined duplexing mode, communicate one or more data channels in a second set of time resources of the TTI according to a second duplexing mode, communicate with the at least one target device according to a full duplex mode, communicate a first set of channels, where the first set of channels is a set of control channels, in a first set of time resources of a TTI according to a first duplexing mode, receive a second control channel in at least one of the uplink direction or the downlink direction in the first set of time resources of the TTI, transmit a first control channel to a second wireless device in a first set of time resources of a TTI, receive a second control channel from the second wireless device in the first set of time resources of the TTI, and transmit a first control channel in at least one of a downlink direction or an uplink direction in a first set of time resources of a TTI. In some cases, the transmission of control channels are unscheduled in the first set of time resources of the TTI. In some cases, the first duplexing mode is a full duplex mode and the second duplexing mode is a half-duplex mode. In some cases, the transmissions of control channels are scheduled in a downlink direction or an uplink direction in the first time resource of the TTI.

Signal type identifier 835 may identify a signal type or channel type associated with the set of communications, where the set of power configurations is identified based on the identified signal type or channel type.

Capability identifier 840 may identify one or more parameters associated with a capability of the wireless device or with a capability of the at least one target device, where the set of power configurations is identified based on the identified one or more parameters.

Traffic demand identifier 845 may identify a level of traffic demand of the wireless device, the at least one target device, or an additional device, where the set of power configurations is identified based on the identified level of traffic demand.

Device parameter identifier 850 may identify one or more parameters associated with one or more wireless communication links between the wireless device and the at least one target device, where the set of power configurations is identified based on the identified one or more parameters.

Figure 9:
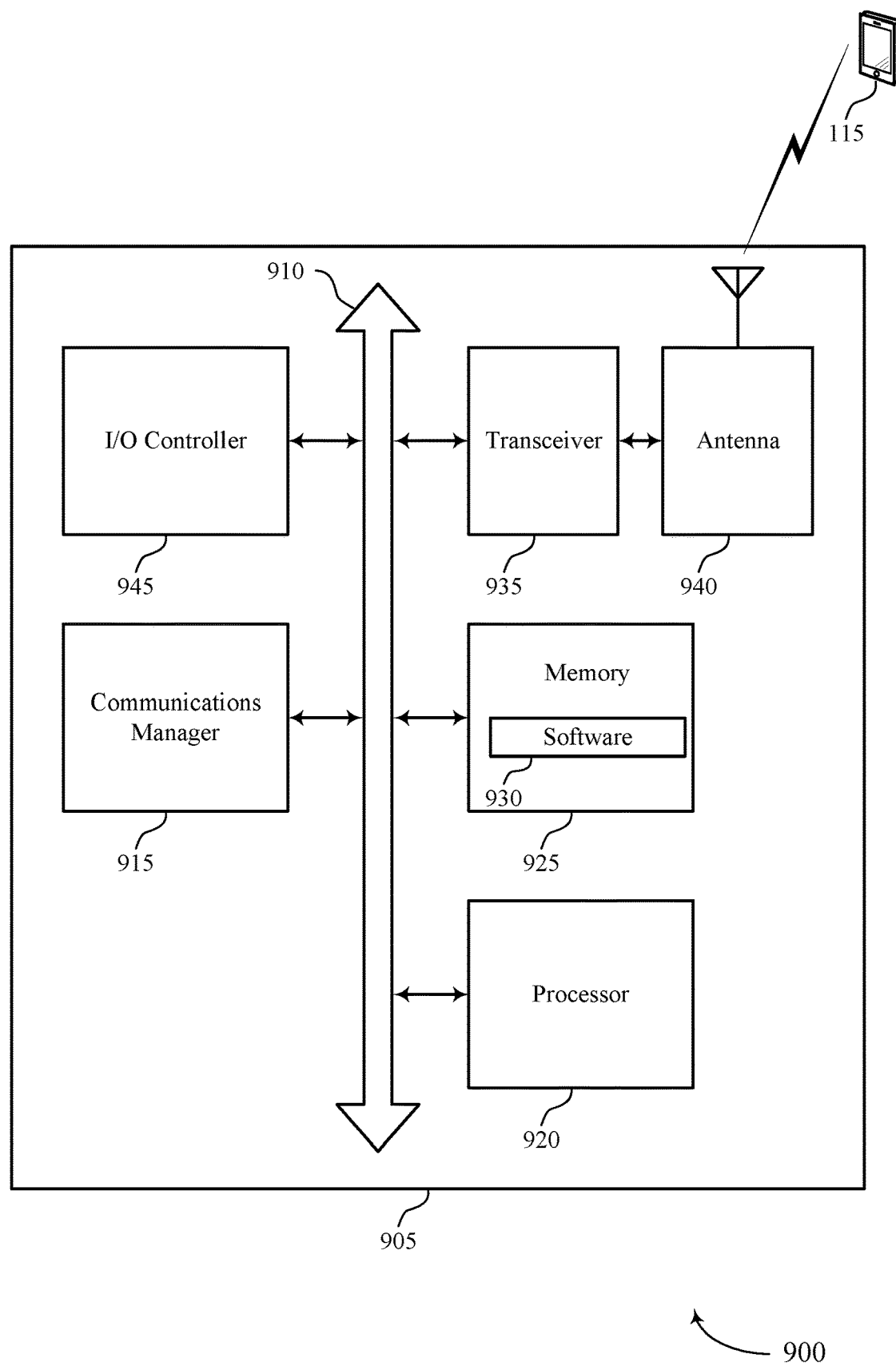
FIG. 9 illustrates a block diagram of a system including a wireless device that supports duplexing modes based on power configurations for transmissions in accordance with aspects of the present disclosure.

FIG. 9 shows a diagram of a system 900 including a device 905 that supports duplexing modes based on power configurations for transmissions in accordance with aspects of the present disclosure. Device 905 may be an example of or include the components of wireless device 605, wireless device 705, or a wireless device 205 as described above, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting duplexing modes based on power configurations for transmissions).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support duplexing modes based on power configurations for transmissions. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
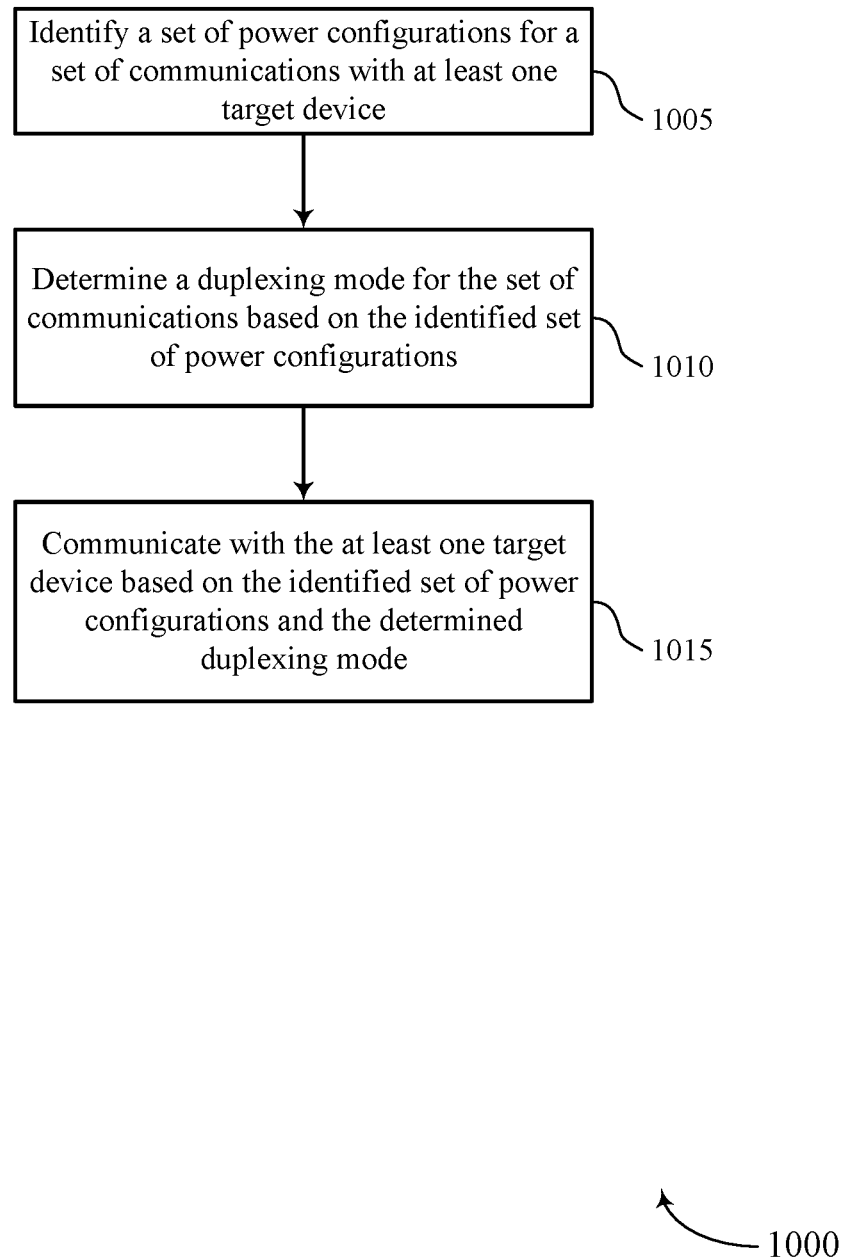
FIG. 10 illustrates a method for duplexing modes based on power configurations for transmissions in accordance with aspects of the present disclosure.

FIG. 10 shows a flowchart illustrating a method 1000 for duplexing modes based on power configurations for transmissions in accordance with aspects of the present disclosure. The operations of method 1000 may be implemented by a wireless device 205 or its components as described herein. For example, the operations of method 1000 may be performed by a communications manager as described with reference to FIGS. 6 through 9. In some examples, a wireless device 205 may execute a set of codes to control the functional elements of the device to perform the functions described below. Additionally, or alternatively, the wireless device 205 may perform aspects of the functions described below using special-purpose hardware.

At 1005 the wireless device 205 may identify a set of power configurations for a set of communications with at least one target device. In some examples, power may be allocated between the target device and a second target device based on the set of power configurations. The operations of 1005 may be performed according to the methods described herein. In certain examples, aspects of the operations of 1005 may be performed by a power configuration identifier as described with reference to FIGS. 6 through 9.

At 1010 the wireless device 205 may determine a duplexing mode for the set of communications based on the identified set of power configurations. The operations of 1010 may be performed according to the methods described herein. In certain examples, aspects of the operations of 1010 may be performed by a duplex mode determination unit as described with reference to FIGS. 6 through 9.

At 1015 the wireless device 205 may communicate with the at least one target device based on the identified set of power configurations and the determined duplexing mode. The operations of 1015 may be performed according to the methods described herein. In certain examples, aspects of the operations of 1015 may be performed by a duplex mode communication manager as described with reference to FIGS. 6 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a control node in a wireless communications system, comprising:
   receiving one or more signals from a first wireless device or a second wireless device, the one or more signals comprising at least a capability parameter for communication with the first wireless device or the second wireless device;
   determining a first duplexing mode based at least in part on the capability parameter, wherein the first duplexing mode is for communications with the first wireless device in the wireless communications system via a first set of time resources of a transmission time interval (TTI);
   determining a second duplexing mode different than the first duplexing mode based at least in part on the capability parameter, wherein the second duplexing mode is for communications with the first wireless device or the second wireless device in the wireless communications system via a second set of time resources of the TTI, and wherein the first duplexing mode and the second duplexing mode each comprise one of a full duplex mode, a half-duplex mode, a single user (SU) multiple input multiple out (MIMO) (SU-MIMO) mode, a multiple user (MU) MIMO (MU-MIMO) mode, or a combination thereof; and
   transmitting, by the control node, an indication of different duplexing modes for different sets of time resources of the TTI to a plurality of wireless devices, wherein transmitting the indication comprises:
      transmitting, to the first wireless device, an indication of the first duplexing mode for the first set of time resources of the TTI; and
      transmitting, to the second wireless device, an indication of the second duplexing mode for the second set of time resources of the TTI.

2. The method of claim 1, wherein transmitting the indication comprises:
   transmitting the indication using a control channel.

3. The method of claim 2, wherein transmitting the indication using the control channel comprises:
   transmitting the indication via one of a radio resource control (RRC) channel, downlink control information (DCI), a physical downlink control channel (PDCCH), a medium access control element (MAC-CE), an F1 application protocol (F1-AP) message, or any combination thereof.

4. The method of claim 1, wherein the one or more signals comprise a measurement report for the first wireless device, a measurement report for the second wireless device, a channel state information reference signal, or any combination thereof.

5. The method of claim 1, further comprising:
   receiving signaling indicating at least one of the first duplexing mode or the second duplexing mode, wherein at least one of the first duplexing mode or the second duplexing mode is determined based at least in part on the received signaling.

6. The method of claim 1, further comprising:
   determining the first duplexing mode or the second duplexing mode based at least in part on a level of traffic demand, capabilities associated with the first wireless device or the second wireless device, limitations associated with the first wireless device or the second wireless device, received measurement reports of one or more reference signals, or a combination thereof.

7. The method of claim 6, wherein the one or more reference signals comprise a synchronization signal, a beam reference signal, a channel state information reference signal, or any combination thereof.

8. The method of claim 1, wherein the control node comprises one of a central node, a scheduler of a wireless device, the first wireless device, or the second wireless device.

9. The method of claim 1, wherein the first duplexing mode is the full duplex mode and the second duplexing mode is the half-duplex mode.

10. The method of claim 1, wherein the capability parameter comprises an analog/digital processing capability, a beamforming capability, a number of antenna, a number of digital chains, a beam-correspondence capability, or a combination thereof associated with the first wireless device or the second wireless device.

11. A method for wireless communication at a wireless device, comprising:

transmitting one or more signals to a control node, the one or more signals comprising at least a capability parameter for communication with the wireless device;

receiving, from the control node, an indication of a first duplexing mode for a first set of time resources of a transmission time interval (TTI) and a second duplexing mode for a second set of time resources of the TTI based at least in part on the capability parameter, the second duplexing mode different from the first duplexing mode;

determining the first duplexing mode based at least in part on the indication, wherein the first duplexing mode is for communications with a first target device via the first set of time resources of the TTI;

determining the second duplexing mode based at least in part on the indication, wherein the second duplexing mode is for communications with the first target device or a second target device via the second set of time resources of the TTI, and wherein the first duplexing mode and the second duplexing mode each comprise one of a full duplex mode, a half-duplex mode, a single user (SU) multiple input multiple out (MIMO) (SU-MIMO) mode, a multiple user (MU) MIMO (MU-MIMO) mode, or a combination thereof;

communicating a first channel in the first set of time resources of the TTI according to the first duplexing mode; and communicating a second channel in the second set of time resources of the TTI according to the second duplexing mode.

12. The method of claim 11, wherein the control node comprises one of a central node, a scheduler of the wireless device, the first target device, or the second target device.

13. The method of claim 11 wherein receiving the indication comprises:
receiving the indication via a control channel.

14. The method of claim 13, wherein receiving the indication via the control channel comprises:
receiving the indication via at least one of a radio resource control (RRC) channel, downlink control information (DCI), a physical downlink control channel (PDCCH), a medium access control element (MAC-CE), an F1 application protocol (F1-AP) message, or any combination thereof.

15. The method of claim 11, wherein the first duplexing mode is the full duplex mode and the second duplexing mode the half-duplex mode.

16. The method of claim 11, wherein the capability parameter comprises an analog/digital processing capability, a beamforming capability, a number of antenna, a number of digital chains, a beam-correspondence capability, or a combination thereof associated with the wireless device.

17. An apparatus for wireless communication at a control node in a wireless communications system, comprising:
a processor,
memory coupled with the processor; and
instructions stored in the memory and executable by the processor to cause the apparatus to:
receive one or more signals from a first wireless device or a second wireless device, the one or more signals comprising at least a capability parameter for communication with the first wireless device or the second wireless device;
determine a first duplexing mode based at least in part on the capability parameter, wherein the first duplexing mode is for communications with the first wireless device in the wireless communications system via a first set of time resources of a transmission time interval (TTI) based at least in part on the capability parameter;
determine a second duplexing mode different than the first duplexing mode based at least in part on the capability parameter, wherein the second duplexing mode is for communications with the first wireless device or the second wireless device in the wireless communications system via a second set of time resources of the TTI, and wherein the first duplexing mode and the second duplexing mode each comprise one of a full duplex mode, a half-duplex mode, a single user (SU) multiple input multiple out (MIMO) (SU-MIMO) mode, a multiple user (MU) MIMO (MU-MIMO) mode, or a combination thereof; and
transmit, by the control node, an indication of different duplexing modes for different sets of time resources of the TTI to a plurality of wireless devices, wherein the instructions to transmit the indication are executable by the processor to cause the apparatus to:
transmit, to the first wireless device, an indication of the first duplexing mode for the first set of time resources of the TTI; and
transmit, to the second wireless device, an indication of the second duplexing mode for the second set of time resources of the TTI.

18. The apparatus of claim 17, wherein the instructions to transmit the indication are executable by the processor to cause the apparatus to:
transmit the indication using a control channel.

19. The apparatus of claim 18, wherein the instructions to transmit the indication using the control channel are further executable by the processor to cause the apparatus to:
transmit the indication via one of a radio resource control (RRC) channel, downlink control information (DCI), a physical downlink control channel (PDCCH), a medium access control element (MAC-CE), an F1 application protocol (F1-AP) message, or any combination thereof.

20. The apparatus of claim 17, wherein: the one or more signals comprise a measurement report for the first wireless device, a measurement report for the second wireless device, a channel state information reference signal, or any combination thereof.

21. The apparatus of claim 17, wherein the instructions are further executable by the processor to cause the apparatus to:
receive signaling indicating at least one of the first duplexing mode or the second duplexing mode, wherein at least one of the first duplexing mode or the second duplexing mode is determined based at least in part on the received signaling.

22. The apparatus of claim 17, wherein the instructions are further executable by the processor to cause the apparatus to:
determine the first duplexing mode or the second duplexing mode based at least in part on a level of traffic demand, capabilities associated with the first wireless device or the second wireless device, limitations associated with the first wireless device or the second wireless device, received measurement reports of one or more reference signals, or a combination thereof.

23. The apparatus of claim 17, wherein the control node comprises one of a central node, a scheduler of a wireless device, the first wireless device, or the second wireless device.

24. An apparatus for wireless communication at a wireless device, comprising:
- a processor,
- memory coupled with the processor; and
- instructions stored in the memory and executable by the processor to cause the apparatus to:
    - transmit one or more signals to a control node, the one or more signals comprising at least a capability parameter for communication with the wireless device;
    - receive, from the control node, an indication of a first duplexing mode for a first set of time resources of a transmission time interval (TTI) and a second duplexing mode for a second set of time resources of the TTI based at least in part on the capability parameter, the second duplexing mode different from the first duplexing mode;
    - determine the first duplexing mode based at least in part on the indication, wherein the first duplexing mode is for communications with a first target device via the first set of time resources of the TTI;
    - determine the second duplexing mode based at least in part on the indication, wherein the second duplexing mode is for communications with the first target device or a second target device via the second set of time resources of the TTI, and wherein the first duplexing mode and the second duplexing mode each comprise one of a full duplex mode, a half-duplex mode, a single user (SU) multiple input multiple out (MIMO) (SU-MIMO) mode, a multiple user (MU) MIMO (MU-MIMO) mode, or a combination thereof;
    - communicate a first channel in the first set of time resources of the TTI according to the first duplexing mode; and
    - communicate a second channel in the second set of time resources of the TTI according to the second duplexing mode.

25. The apparatus of claim 24, wherein the instructions to receive the indication are further executable by the processor to cause the apparatus to:
- receive the indication via a control channel.

26. The apparatus of claim 25, wherein the instructions to receive the indication via the control channel are further executable by the processor to cause the apparatus to:
- receive the indication via at least one of a radio resource control (RRC) channel, downlink control information (DCI), a physical downlink control channel (PDCCH), a medium access control element (MAC-CE), an F1 application protocol (F1-AP) message, or any combination thereof.

* * * * *